United States Patent
Ting

(10) Patent No.: US 7,702,179 B2
(45) Date of Patent: Apr. 20, 2010

(54) METHOD AND RELATED COMPENSATION CIRCUIT FOR COMPENSATING BLACK CORES OF AN IMAGE SENSOR

(75) Inventor: Hou-Chun Ting, Changhua County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 874 days.

(21) Appl. No.: 11/535,990

(22) Filed: Sep. 28, 2006

(65) Prior Publication Data

US 2007/0253632 A1    Nov. 1, 2007

(30) Foreign Application Priority Data

Apr. 28, 2006    (TW) ............... 95115351 A

(51) Int. Cl.
    *G06K 9/40* (2006.01)
(52) U.S. Cl. ............... 382/275; 382/239; 382/165; 382/312; 348/251; 348/312
(58) Field of Classification Search ............... 382/275
    See application file for complete search history.

(56) References Cited

U.S. PATENT DOCUMENTS

| | | | |
|---|---|---|---|
| 2,202,511 A * | 5/1940 | Andrieu ............... 348/251 |
| 2,375,968 A * | 5/1945 | Von Felgel-Farnholz .... 348/251 |
| 4,910,608 A * | 3/1990 | Whiteman et al. ........... 382/239 |
| 5,748,231 A * | 5/1998 | Park et al. ............... 348/207.99 |
| 5,784,488 A * | 7/1998 | Kuwata ..................... 382/176 |
| 6,377,714 B1 * | 4/2002 | Hilbert et al. ............... 382/312 |
| 6,934,412 B2 * | 8/2005 | Bares ......................... 382/165 |
| 7,042,368 B2 * | 5/2006 | Patterson et al. ........ 340/870.29 |
| 2002/0075491 A1 * | 6/2002 | Bares ......................... 358/1.9 |
| 2002/0135691 A1 * | 9/2002 | Lee et al. ..................... 348/312 |
| 2004/0129887 A1 * | 7/2004 | Vydrin et al. ............... 250/367 |
| 2006/0115177 A1 * | 6/2006 | Ishiga ......................... 382/275 |

FOREIGN PATENT DOCUMENTS

JP    57017268 A  *  1/1982
JP    63059268 A  *  3/1988

* cited by examiner

*Primary Examiner*—Samir A Ahmed
*Assistant Examiner*—Tsung-Yin Tsai
(74) *Attorney, Agent, or Firm*—Winston Hsu

(57) ABSTRACT

A method for compensating black cores includes detecting whether an external illumination level of an image device is greater than a predetermined illumination value. The method includes detecting whether an intensity of a first portion of input pixels is greater than a first predetermined threshold, an intensity of a second portion of input pixels is smaller than the first predetermined threshold and greater than a second predetermined threshold and an intensity of a third portion of input pixels is smaller than the second predetermined threshold when detecting a plurality of input pixels of a scan line. The method includes correcting the intensity of the third portion of input pixels that is smaller than the second predetermined threshold.

3 Claims, 11 Drawing Sheets

METHOD AND RELATED COMPENSATION CIRCUIT FOR COMPENSATING BLACK CORES OF AN IMAGE SENSOR

BACKGROUND OF THE INVENTION

1. Field of the Invention

The present invention relates to a method for compensating black cores of an image sensor, and more particularly, to a method correcting the intensity of a portion of input pixels where the intensity is smaller than a second predetermined threshold.

2. Description of the Prior Art

In recent years, complementary metal-oxide semiconductor (CMOS) image sensors have become popular solid-state image sensors, largely replacing charge-coupled devices (CCD). Because CMOS image sensors are manufactured by conventional semiconductor manufacturing process, the conventional semiconductor manufacturing process has both low cost and low power consumption. Besides, CMOS image sensors have high quantum efficiency and low read-out noise, and thus have been popularly applied in PC and digital cameras.

Black core phenomenon usually happens in CMOS image sensors (but not limited to CMOS image sensors only). In normal photographic situations, black core phenomenon will not occur. Only when facing the sun to take a picture, black cores of CMOS image sensors will occur due to the strong sunlight.

Please refer to FIG. 1. FIG. 1 is a diagram of a photograph 10 showing black core phenomenon. The photograph 10 includes a sun 12, a first object 15 and a second object 17. The first object 15 and the second object 17 are both black objects with the lowest intensity level. The sun 12 has the highest intensity level. In the middle part of the sun 12, a black core 14 occurs. The black core 14 also has the lowest intensity level. In this embodiment, although the black core 14, the first object 15 and the second object 17 have the lowest intensity level, only the intensity level of the black core 14 is wrong. Hence, before compensating black core phenomenon, distinction between the black core 14 and other black objects is required.

Please refer to FIG. 2 that is a diagram showing scanning order. When scanning an image, one scan line is detected at one time because image storages dealing with a two-dimensional image cost too much. As shown in FIG. 2, scanning starts from the upper left corner of the image. A straight line is scanned from the left to the right, and then the next straight line is scanned till the whole image is scanned completely (the lower right corner of the image).

Please refer to FIG. 3. FIG. 3 is a diagram showing an example that has scan lines passing through a sun. There is a black core 36 occurring in the middle part of a sun 34. A transition region 38 occurs between the sun 34 and the black core 36. Assume that of three scan lines passing through the sun 34, only a second scan line 32 passes through the region of the black core 36. A first scan line 31 and a third scan line 33 do not pass through the region of the black core 36. A width of the transition region 38 is usually smaller than a shadow of a usual object.

Please refer to FIG. 4 and FIG. 3. FIG. 4 is a diagram of an intensity curve of the first scan line 31 in FIG. 3. The horizontal axis represents each input pixel, and the vertical axis represents the intensity of that input pixel. As shown in FIG. 3, the first scan line 31 is divided into three portions by the sun 34, the three portions are named as a first portion 31A, a second portion 31B, and a third portion 31C in order. Assume that an intensity of the first portion 31A is IA1 with a magnitude between a high threshold TH and a low threshold TL. An intensity of the second portion 31B is IB1 with a magnitude greater than the high threshold TH. An intensity of the third portion 31C is IA1. Because the sun 34 has the highest intensity level, the intensity IB1 of the second portion 31B is greater than the high threshold TH.

Please refer to FIG. 5 and FIG. 3. FIG. 5 is a diagram of an intensity curve of the second scan line 32 in FIG. 3. The horizontal axis represents each input pixel, and the vertical axis represents the intensity of each input pixel. As shown in FIG. 3, the second scan line 32 is divided into seven portions by the sun 34, the black core 36 and the transition region 38; the seven portions are named as 32A-32G in order. Assume that an intensity of the first portion 32A is IA2 with a magnitude between a high threshold TH and a low threshold TL. An intensity of the second portion 32B is IB2 with a magnitude greater than the high threshold TH. An intensity of the third portion 32C represents a straight line having a negative slope with a magnitude decreasing from IB2 to ID2. An intensity of the fourth portion 32D is ID2 with a magnitude lower than the low threshold TL. An intensity of the fifth portion 32E represents a straight line having a positive slope with a magnitude increasing from ID2 to IB2. An intensity of the sixth portion 32F is IB2, which is the same as the intensity of the second portion 32B. An intensity of the seventh portion 32G is IA2, which is the same as the intensity of the first portion 32A.

Because the sun 34 has the highest intensity level, the intensity IB2 of the second portion 32B and the sixth portion 32F is greater than the high threshold TH. The intensity ID2 of the fourth portion 32D is lower than the low threshold TL due to the black core 36 having the lowest intensity level. Because the transition region 38 lies between the sun 34 and the black core 36, an intensity of the transition region 38 lies between the intensity of the sun 34 and the intensity of the black core 36. Hence, the intensity of the third portion 32C and the fifth portion 32E lies between IB2 and ID2.

Please refer to FIG. 6 that is a diagram of a digital camera 60. The digital camera 60 includes a lens module 62, an image sensor 64, an image signal processor 66, a storage 68, and a display panel 67. The image sensor 64 is coupled to the lens module 62, and the image signal processor 66 is coupled to the image sensor 64. The storage 68 is coupled to the image signal processor 66, and the display panel 67 is coupled to the image signal processor 66. When the reflected light of a target object forms an image in the image sensor 64 through the lens module 62, the image sensor 64 transforms light signals into electronic signals and delivers electronic signals to the image signal processor 66. The display panel 67 is used for previewing images, and the storage 68 is used for storing images after processing. The black core phenomenon described above usually occurs in the image sensor 64, and black cores are compensated for in the image signal processor 66.

Black core phenomenon usually happens in CMOS image sensors (but not limited to CMOS image sensors only). When facing the sun to take a picture, black cores of CMOS image sensors will occur due to the strong sunlight. This is occurred due to the structure of CMOS image sensors. This deteriorates photographs and further causes user's trouble.

SUMMARY OF THE INVENTION

The claimed invention provides a method for compensating black cores of an image sensor. The method includes detecting whether an external illumination level of an image device is greater than a predetermined illumination value, detecting whether an intensity of a first portion of input pixels is greater than a first predetermined threshold, an intensity of a second portion of input pixels is smaller than the first predetermined threshold and greater than a second predetermined threshold, and an intensity of a third portion of input pixels is smaller than the second predetermined threshold when detecting a plurality of input pixels of a scan line if the external illumination level of the image device is greater than the predetermined illumination value, and correcting the intensity of the third portion of input pixels that is smaller than the second predetermined threshold if the intensity of the first portion of input pixels is greater than the first predetermined threshold, the intensity of the second portion of input pixels is smaller than the first predetermined threshold and greater than the second predetermined threshold and the intensity of the third portion of input pixels is smaller than the second predetermined threshold. The plurality of input pixels of the scan line comprises the first portion of input pixels located adjacent to the second portion of input pixels, the second portion of input pixels located adjacent to the third portion of input pixels, and the third portion of input pixels.

The claimed invention provides another method for compensating black cores of an image sensor. The method includes detecting whether an external illumination level of an image device is greater than a predetermined illumination value, detecting whether an intensity of a first group of input pixels is greater than a first predetermined threshold, an intensity of a second group of input pixels is smaller than the first predetermined threshold and greater than a second predetermined threshold, an intensity of a third group of input pixels is smaller than the second predetermined threshold, an intensity of a fourth group of input pixels is smaller than the first predetermined threshold and greater than the second predetermined threshold, and an intensity of a fifth group of input pixels is greater than the first predetermined threshold when detecting a plurality of input pixels of a scan line if the external illumination level of the image device is greater than the predetermined illumination value, and correcting the intensity of the third group of input pixels that is smaller than the second predetermined threshold if the intensity of the first group of input pixels is greater than the first predetermined threshold, the intensity of the second group of input pixels is smaller than the first predetermined threshold and greater than the second predetermined threshold, the intensity of the third group of input pixels is smaller than the second predetermined threshold, the intensity of the fourth group of input pixels is smaller than the first predetermined threshold and greater than the second predetermined threshold, and the intensity of the fifth group of input pixels is greater than the first predetermined threshold. The plurality of input pixels of the scan line includes the first group of input pixels located adjacent to the second group of input pixels, the second group of input pixels located adjacent to the third group of input pixels, the third group of input pixels located adjacent to the fourth group of input pixels, the fourth group of input pixels located adjacent to the fifth group of input pixels, and the fifth group of input pixels.

The claimed invention provides a black core compensation circuit of an image sensor. The black core compensation circuit includes a first comparator, a second comparator, a counter, a judgment logic and a multiplexer. The first comparator includes a first input end for receiving an input pixel and a second input end for receiving a first predetermined threshold. The first comparator is used for comparing an intensity of the input pixel with the first predetermined threshold. The second comparator includes a first input end for receiving the input pixel and a second input end for receiving a second predetermined threshold. The second comparator is used for comparing the intensity of the input pixel with the second predetermined threshold. The multiplexer includes a first input end for receiving the input pixel and a second input end for receiving a predetermined correction value. The multiplexer is used for outputting the input pixel or the predetermined correction value according to an output result from the first comparator and the second comparator and an output result from the counter and the judgment logic. The counter is coupled to the first comparator, the second comparator, and the multiplexer. The judgment logic is coupled to the first comparator, the second comparator, the counter, and the multiplexer. The judgment logic is used for deciding an output value of the multiplexer according to the output result of the first comparator, the second comparator, and the counter.

These and other objectives of the present invention will no doubt become obvious to those of ordinary skill in the art after reading the following detailed description of the preferred embodiment that is illustrated in the various figures and drawings.

DETAILED DESCRIPTION

Figure 7:
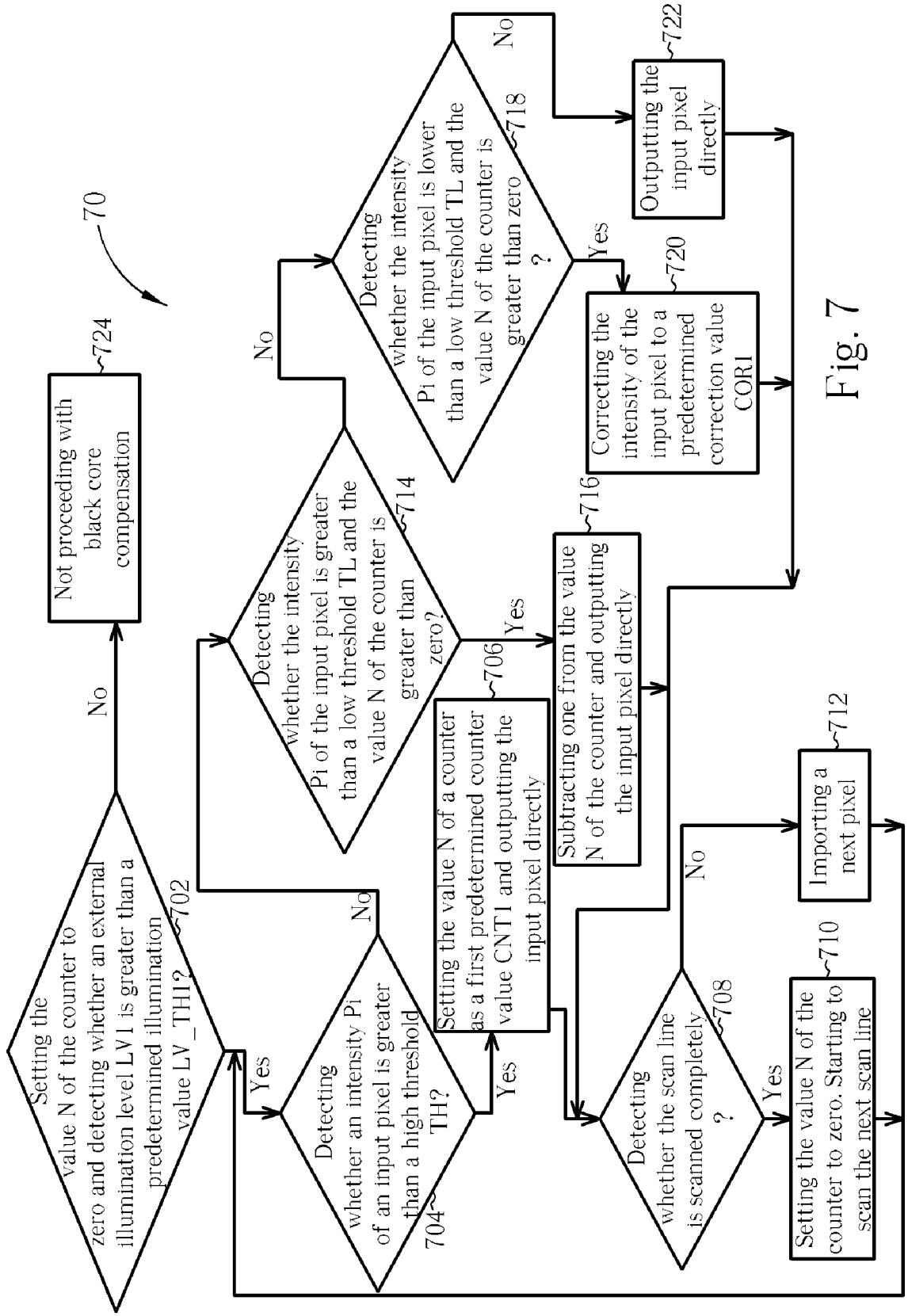
FIG. 7 is a flow chart illustrating how to compensate black cores according to an embodiment of the present invention.

Please refer to FIG. 7. FIG. 7 is a diagram of a flow chart 70 illustrating how to compensate black cores according to an embodiment of the present invention. The flow chart 70 includes the following steps:

Step 702: Setting the value N of the counter to zero and detecting whether an external illumination level of an image device is greater than a predetermined illumination value LV_TH1.

Step 704: Detecting whether an intensity Pi of an input pixel of a scan line is greater than a high threshold TH.

Step 706: Setting the value N of a counter as a first predetermined counter value CNT1 and outputting the input pixel directly.

Step 708: Detecting whether the scan line is scanned completely.

Step 710: Setting the value N of the counter to zero. Starting to scan the next scan line.

Step 712: Importing a next pixel.

Step 714: Detecting whether the intensity Pi of the input pixel is greater than a low threshold TL and the value N of the counter is greater than zero.

Step 716: Subtracting one from the value N of the counter and outputting the input pixel directly.

Step 718: Detecting whether the intensity Pi of the input pixel is lower than a low threshold TL and the value N of the counter is greater than zero.

Step 720: Correcting the intensity of the input pixel to a predetermined correction value COR1.

Step 722: Outputting the input pixel directly.

Step 724: Not proceeding with black core compensation.

In step 702, whether the external illumination level LV1 of the image device is greater than the predetermined illumination value LV_TH1 is determined first. Only when the external illumination level LV1 of the image device is greater than the predetermined illumination value LV_TH1, black core compensation will proceed. The intensity of each input pixel is detected and determined in order. In step 720, only when the intensity Pi of the input pixel is lower than the low threshold TL, the intensity Pi of the input pixel is corrected to the predetermined correction value COR1. The value of the predetermined correction value COR1 is greater than the high threshold TH. In step 716, the value N of the counter is used for calculating the width of the transition region (the amount of the input pixels).

Figure 1:
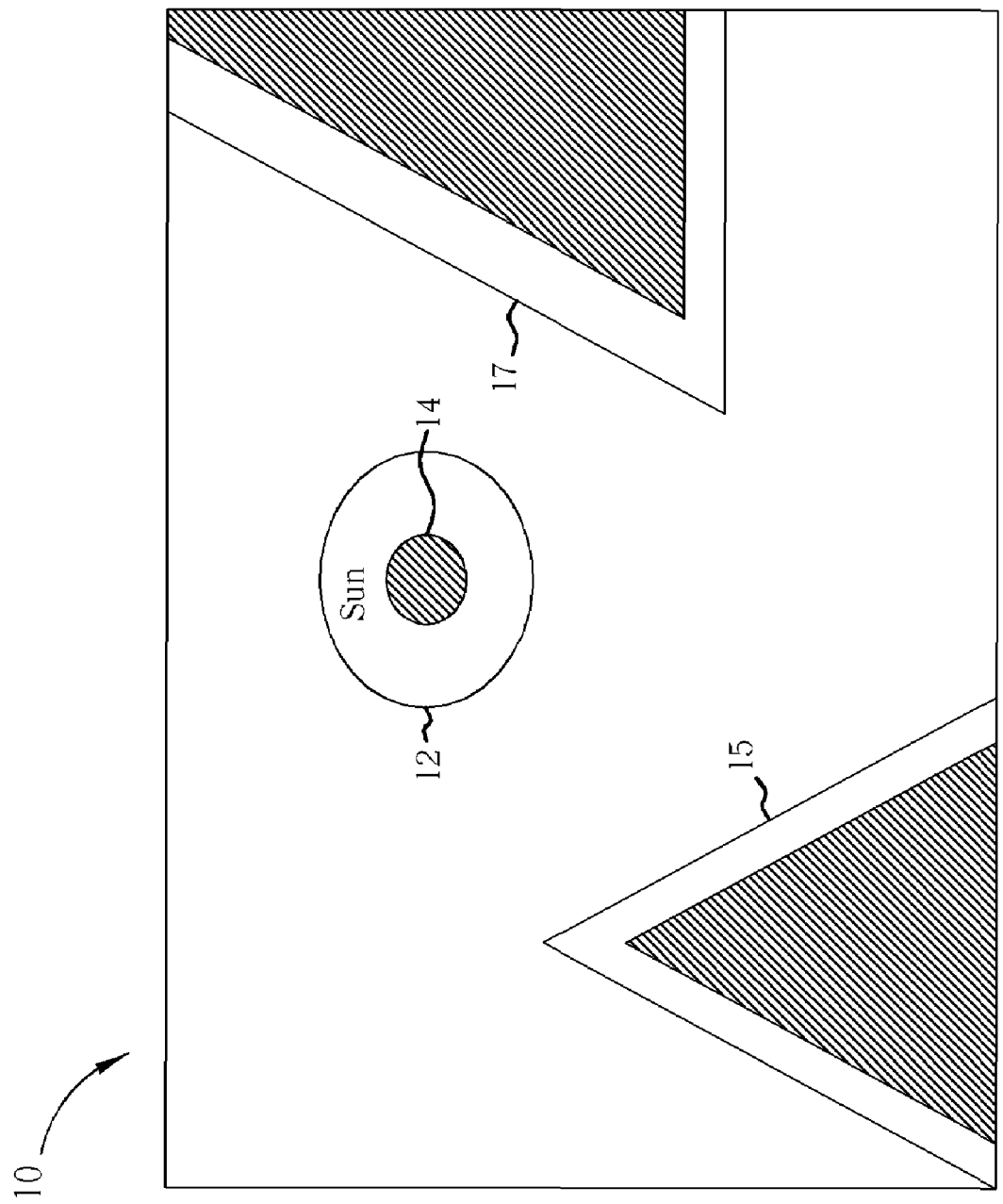
FIG. 1 is a diagram of a photograph showing black core phenomenon.
Figure 2:
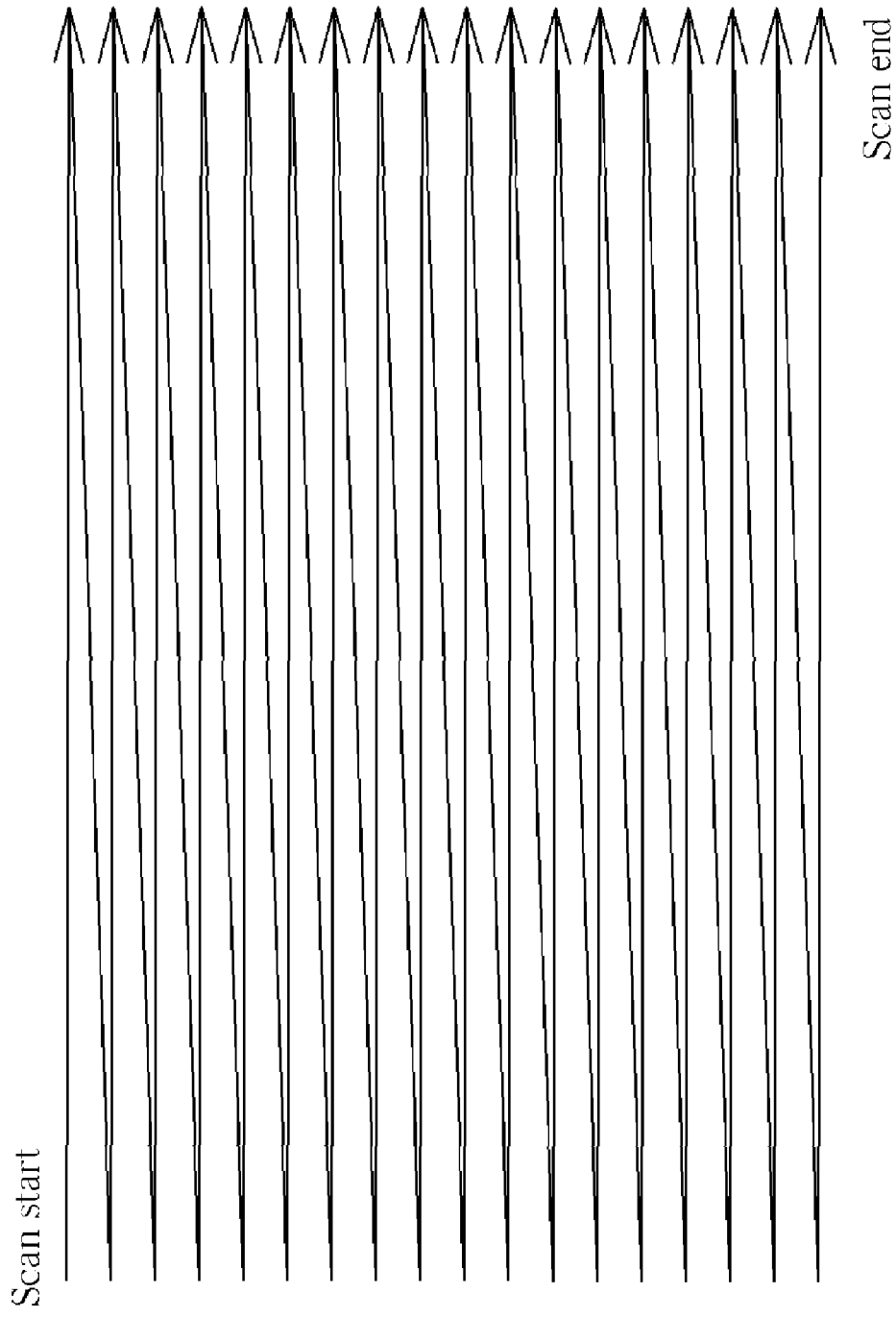
FIG. 2 is a diagram showing scanning order.
Figure 3:
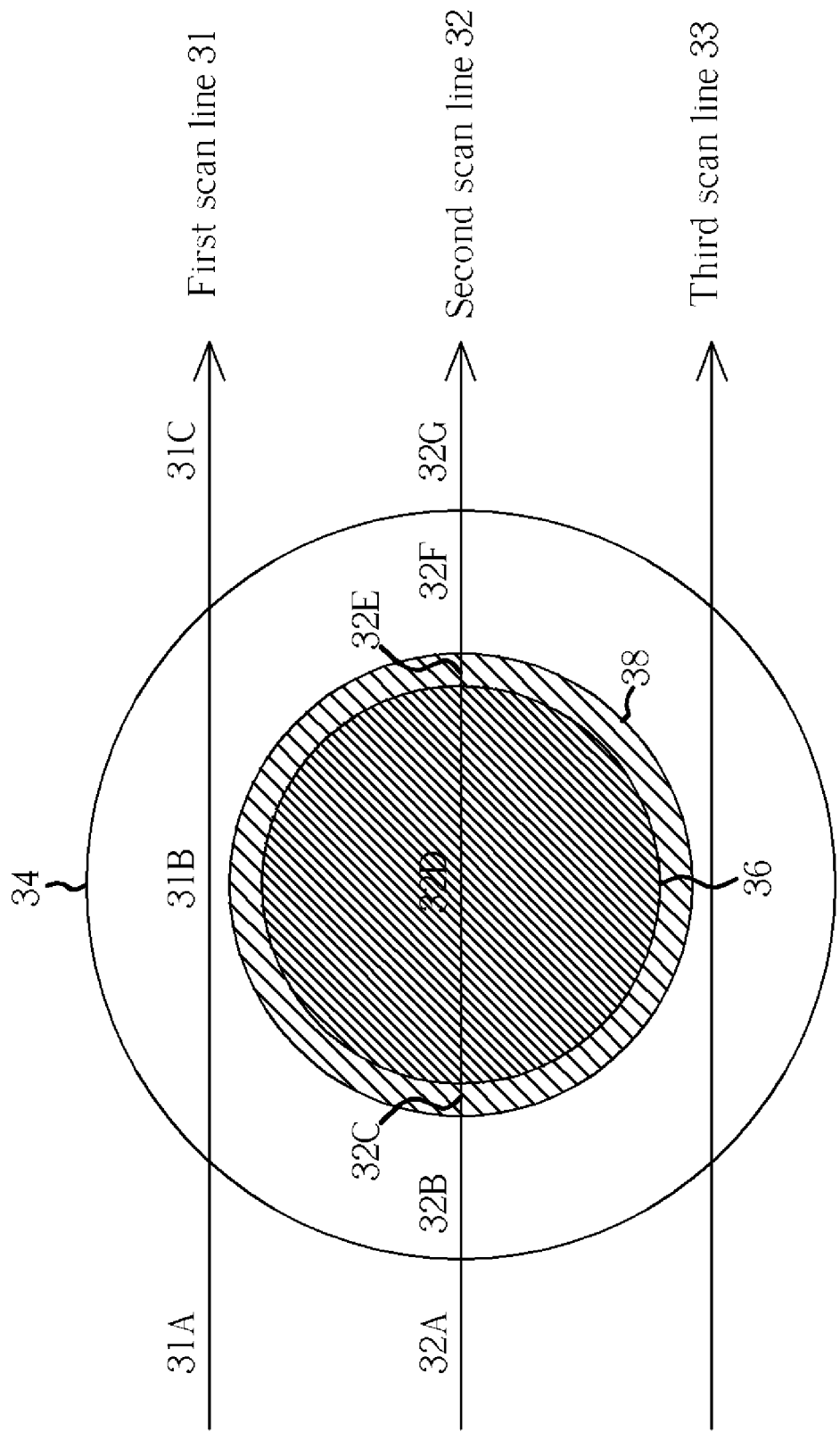
FIG. 3 is a diagram showing an example that has scan lines passing through a sun.
Figure 4:
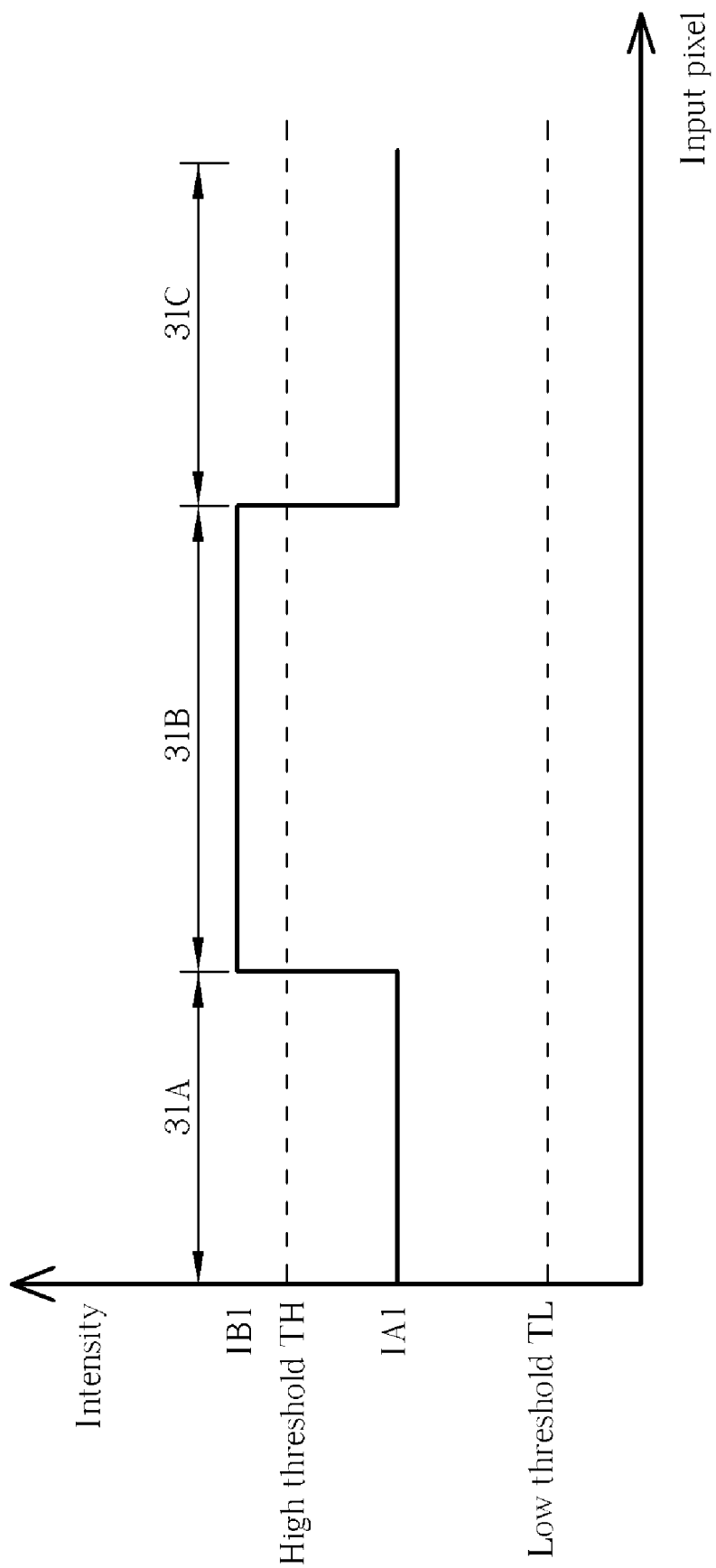
FIG. 4 is a diagram of the intensity curve of the first scan line in FIG. 3.
Figure 5:
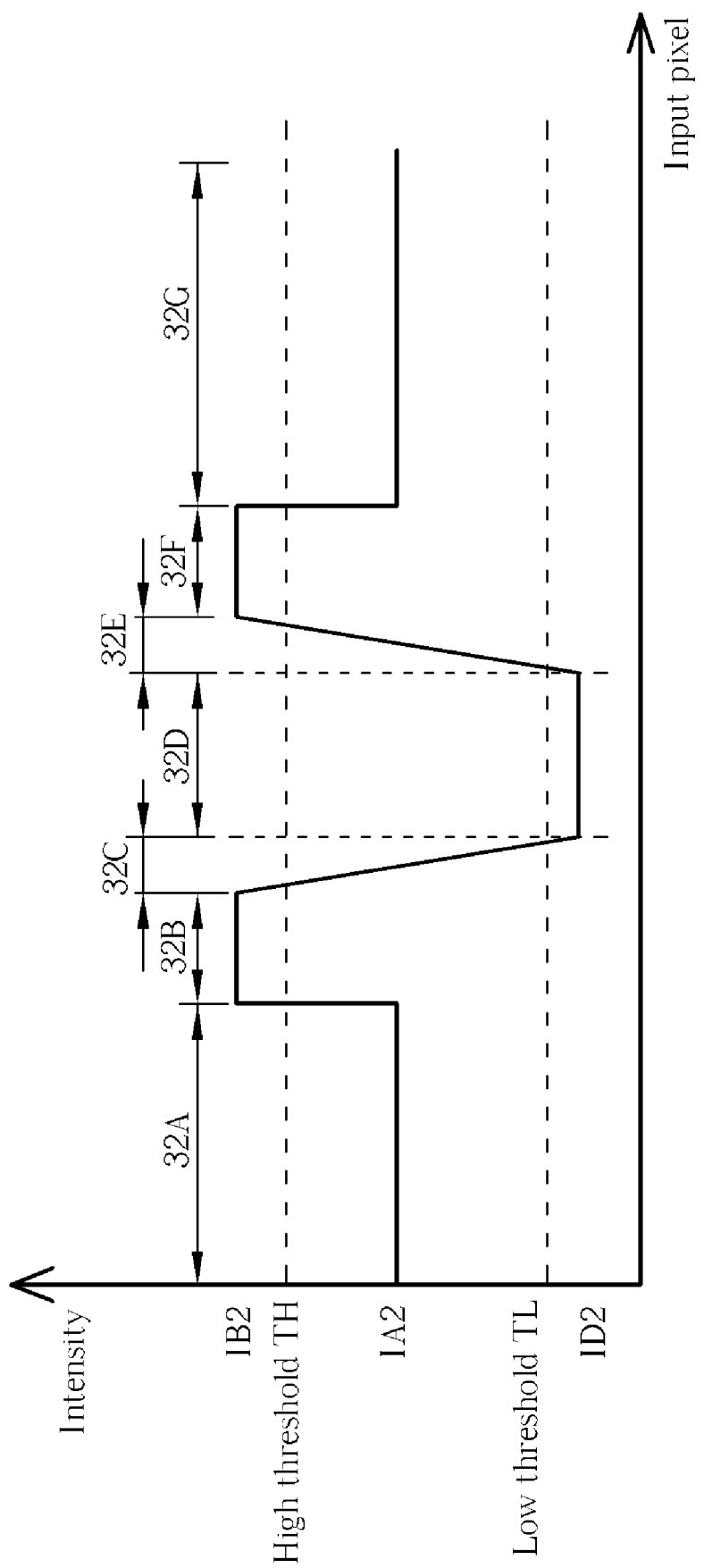
FIG. 5 is a diagram of the intensity curve of the second scan line in FIG. 3.
Figure 6:
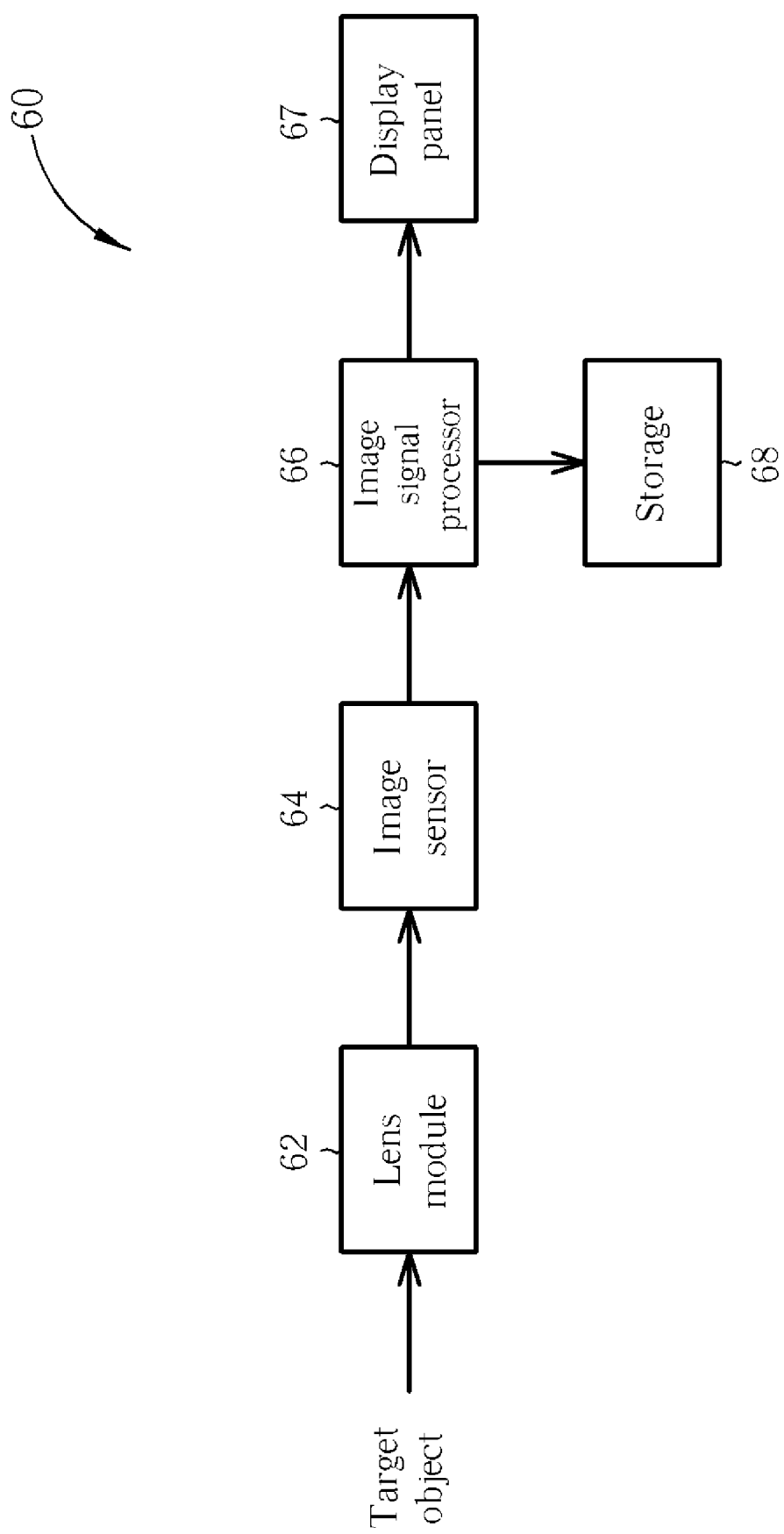
FIG. 6 is a diagram of a digital camera.
Figure 8:
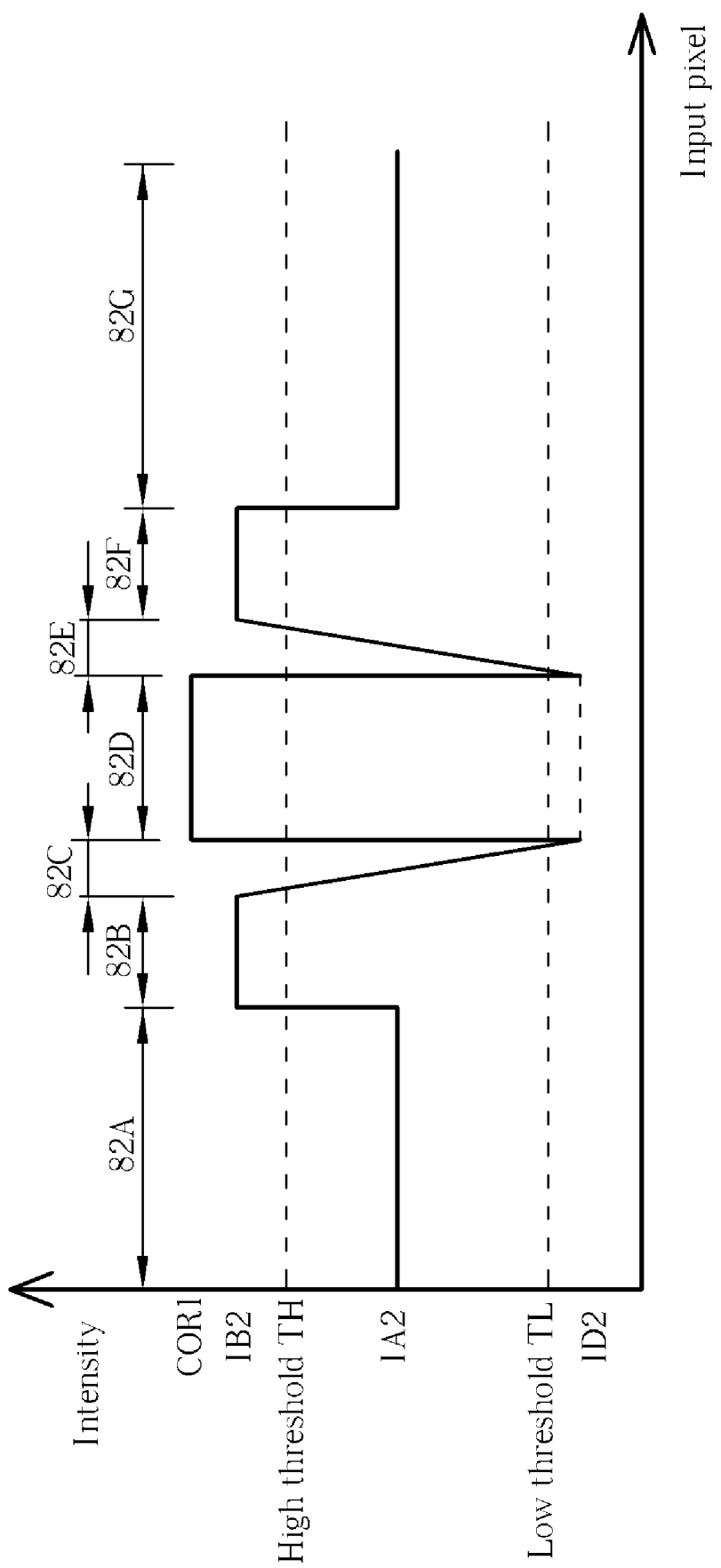
FIG. 8 is a diagram of the intensity curve of the second scan line after compensation according to the flow chart in FIG. 7.

Please refer to FIG. 8 and FIG. 5. FIG. 8 is a diagram of the intensity curve 32 of the second scan line after compensation by the flow chart 70 in FIG. 7. The horizontal axis represents each input pixel, and the vertical axis represents the intensity of the respective input pixel. The corrected second scan line 32 is divided into seven portions, named as 82A-82G in order. Assume that an intensity of the first portion 82A is IA2 with a magnitude between a high threshold TH and a low threshold TL. An intensity of the second portion 82B is IB2 with a magnitude greater than the high threshold TH. An intensity of the third portion 82C represents a straight line having a negative slope with a magnitude decreasing from IB2 to ID2. The original intensity of the fourth portion 82D is ID2 with a magnitude lower than the low threshold TL. The intensity of the fourth portion 82D is corrected to the predetermined correction value COR1. An intensity of the fifth portion 82E represents a straight line having a positive slope with a magnitude increasing from ID2 to IB2. An intensity of the sixth portion 82F is IB2 that is the same as the intensity of the second portion 82B. An intensity of the seventh portion 82G is IA2 that is the same as the intensity of the first portion 82A.

Figure 9:
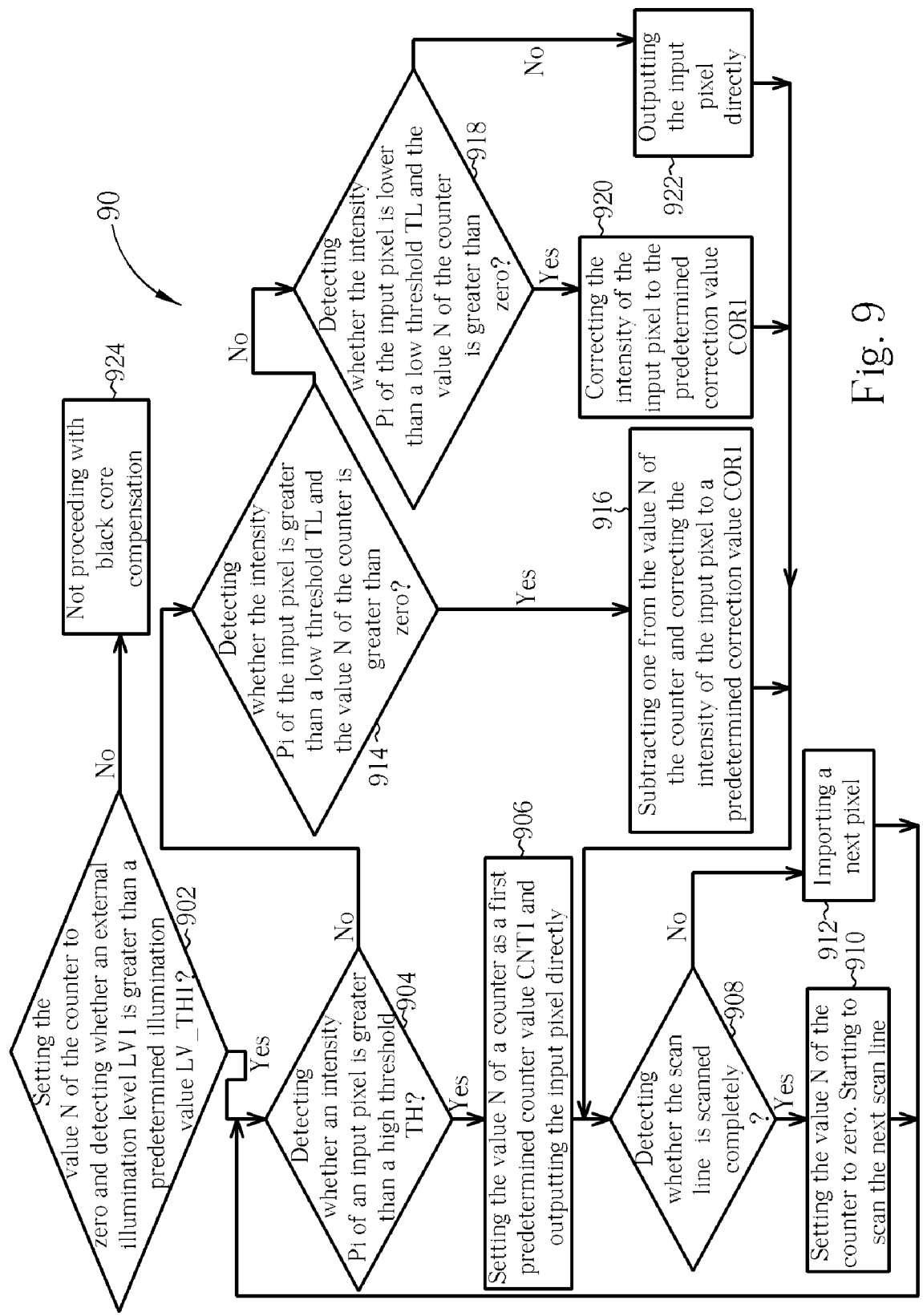
FIG. 9 is a flow chart illustrating how to compensate black cores according to another embodiment of the present invention.

Please refer to FIG. 9 that is a diagram of flow chart 90 illustrating how to compensate black cores according to another embodiment of the present invention. The flow chart 90 includes the following steps:

Step 902: Setting the value N of the counter to zero and detecting whether an external illumination level of an image device is greater than a predetermined illumination value LV_TH1.

Step 904: Detecting whether an intensity Pi of an input pixel of a scan line is greater than a high threshold TH.

Step 906: Setting a value N of a counter as a first predetermined counter value CNT1 and outputting the input pixel directly.

Step 908: Detecting whether the scan line is scanned completely.

Step 910: Setting the value N of the counter to zero. Starting to scan the next scan line.

Step 912: Importing a next pixel.

Step 914: Detecting whether the intensity Pi of the input pixel is greater than a low threshold TL and the value N of the counter is greater than zero.

Step 916: Subtracting one from the value N of the counter and correcting the intensity of the input pixel to a predetermined correction value COR1.

Step 918: Detecting whether the intensity Pi of the input pixel is lower than a low threshold TL and the value N of the counter is greater than zero.

Step 920: Correcting the intensity of the input pixel to the predetermined correction value COR1.

Step 922: Outputting the input pixel directly.

Step 924: Not proceeding with black core compensation.

The difference between the flow 70 and the flow 90 is the step 916. When the intensity Pi of the input pixel is greater than the low threshold TL and lower than the high threshold TH, the intensity Pi of the input pixel is corrected to the predetermined correction value COR1. The value of the predetermined correction value COR1 is greater than the high threshold TH.

Figure 10:
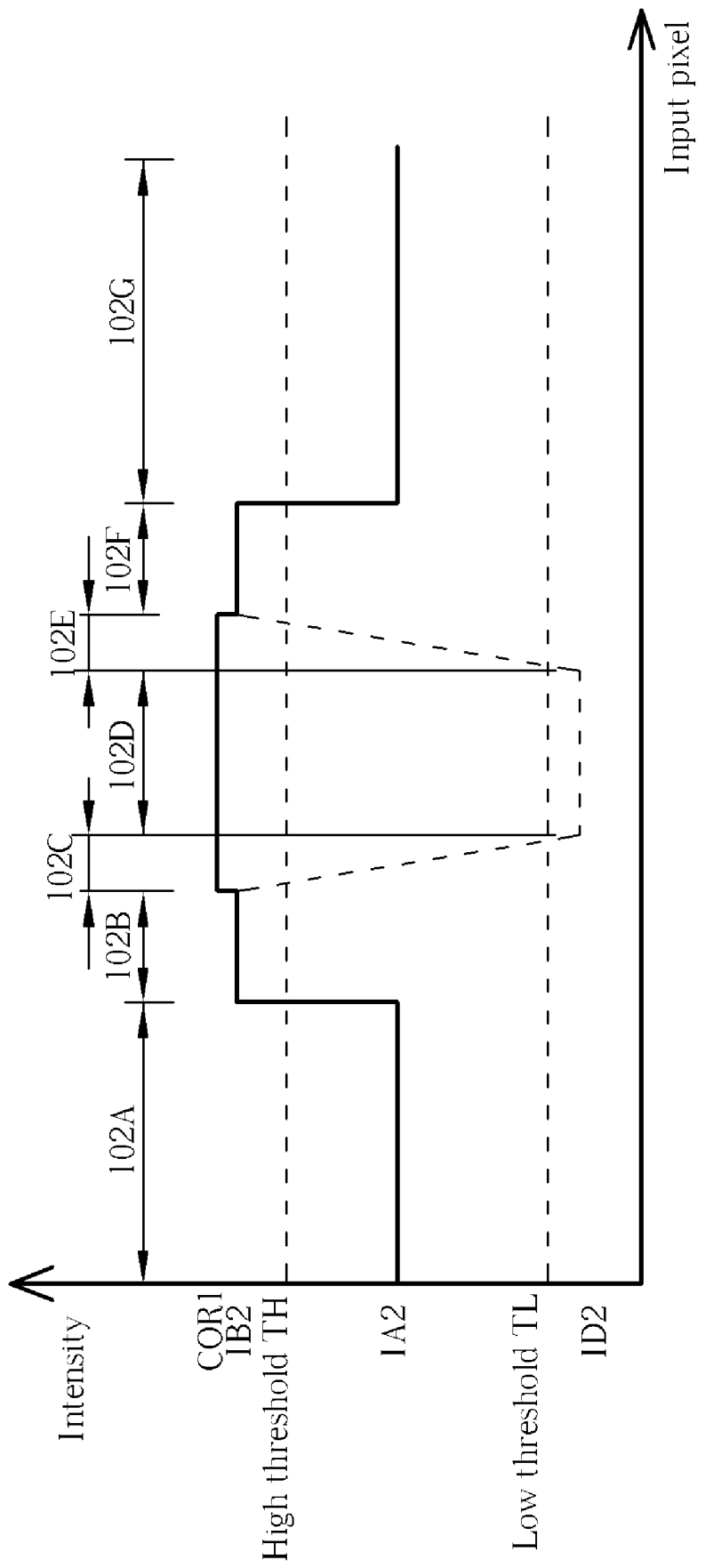
FIG. 10 is a diagram of the intensity curve of the second scan line after compensation according to the flowchart in FIG. 9.

Please refer to FIG. 10. FIG. 10 is a diagram of the intensity curve of the second scan line 32 after compensation according to the flow chart 90 in FIG. 9. The horizontal axis represents each input pixel, and the vertical axis represents the intensity of the respective input pixel. The corrected second scan line 32 is divided into seven portions, named as 102A-102G in order. Assume that an intensity of the first portion 102A is IA2 with a magnitude between a high threshold TH and a low threshold TL. An intensity of the second portion 102B is IB2 with a magnitude greater than the high threshold TH. The original intensity of the third portion 102C represents a straight line having a negative slope with a magnitude decreasing from IB2 to ID2 (dashed line). The intensity of the third portion 102C is corrected to the predetermined correction value COR1. The original intensity of the fourth portion 102D is ID2 with a magnitude lower than the low threshold TL. The intensity of the fourth portion 102D is corrected to the predetermined correction value COR1. The original intensity of the fifth portion 102E represents a straight line having a positive slope with a magnitude increasing from ID2 to IB2 (dashed line). The intensity of the fifth portion 102E is corrected to the predetermined correction value COR1. An intensity of the sixth portion 102F is IB2 that is the same as the intensity of the second portion 102B. An intensity of the seventh portion 102G is IA2 that is the same as the intensity of the first portion 102A. The difference between FIG. 8 and FIG. 10 is that the intensities of the third portion 102C and the fifth portion 102E are corrected to predetermined correction value COR1.

Figure 11:
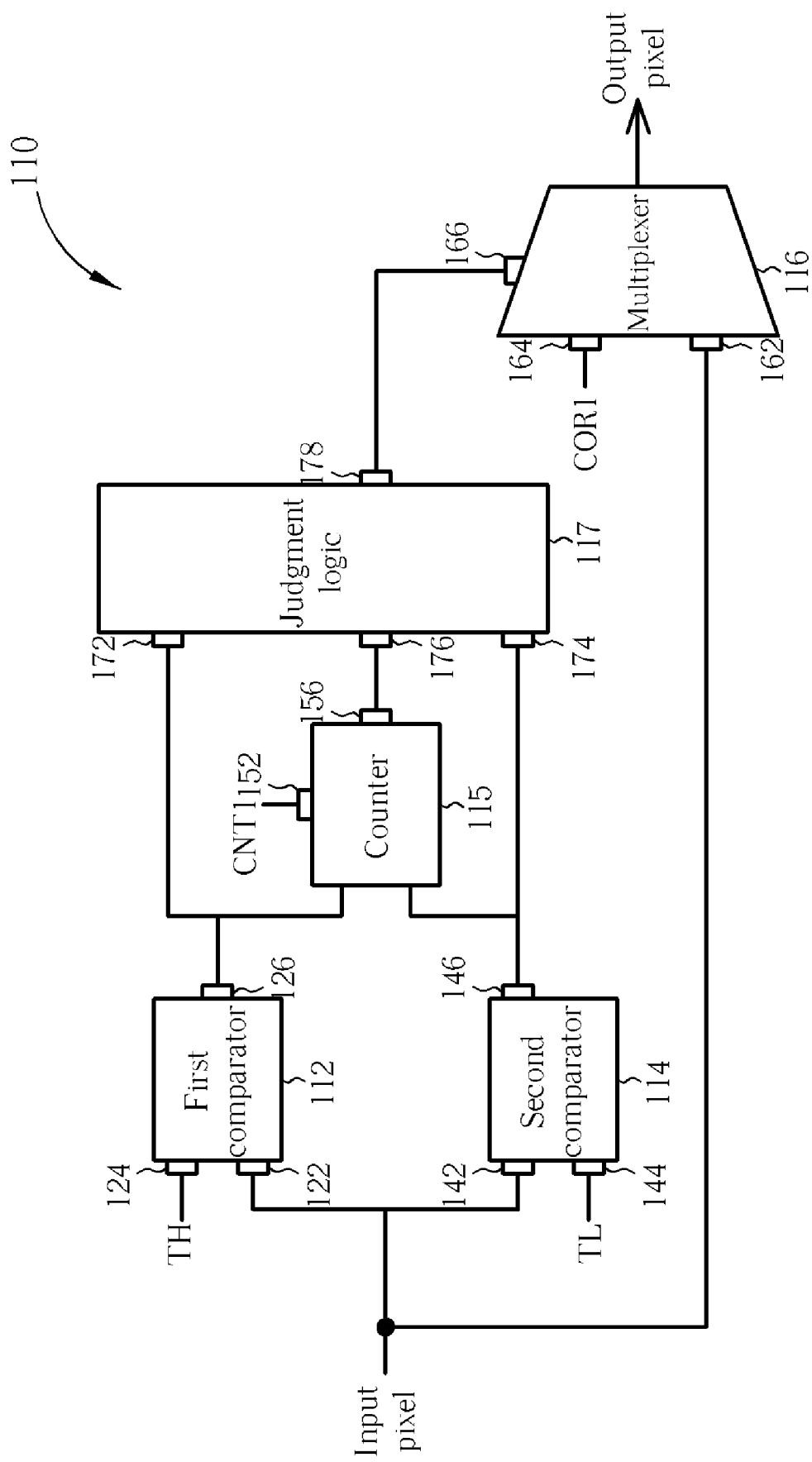
FIG. 11 is a diagram of a black core compensation circuit of an image sensor according to the present invention.

Please refer to FIG. 11 that is a diagram of a black core compensation circuit 110 of an image sensor according to the present invention. The black core compensation circuit 110 includes a first comparator 112, a second comparator 114, a counter 115, a multiplexer 116, and a judgment logic 117. A first input end 122 of the first comparator 112 is used for receiving an input pixel, and a second input end 124 of the first comparator 112 is used for receiving a high threshold TH. The first comparator 112 is used for comparing an intensity of the input pixel with the high threshold TH. A first input end 142 of the second comparator 114 is used for receiving the input pixel, and a second input end 144 of the second comparator 114 is used for receiving a low threshold TL. The second comparator 114 is used for comparing the intensity of the input pixel with the low threshold TL.

The counter 115 is coupled between the first comparator 112, the second comparator 114, and the judgment logic 117. The counter 115 includes a first input end 152 for receiving a first predetermined counter value CNT1. The judgment logic 117 is coupled between the first comparator 112, the second comparator 114, the counter 115, and the multiplexer 116. The judgment logic 117 includes a first input end 172 coupled to an output end 126 of the first comparator 112, a second input end 174 coupled to an output end 146 of the second comparator 114, a third input end 176 coupled to an output end 156 of the counter 115, and an output end 178 coupled to an control end 166 of the multiplexer 116. The judgment logic 117 is used for deciding an output value of the multiplexer 116 according to the output result of the first comparator 112, the second comparator 114, and the counter 115. The multiplexer 116 includes a first input end 162 for receiving the input pixel and a second input end 164 for receiving a predetermined correction value COR1.

The above-mentioned embodiments illustrate but do not limit the present invention. The predetermined correction value COR1 is not restricted to a fixed value, but it must be greater than the high threshold TH and closer to the intensity level of the sun 34 to make the image after compensation hardly distinguishable. The value N of the counter is used for helping to detect black core phenomenon. If the black core phenomenon happens, the amount of the transition region usually lies in a fixed range. Furthermore, the judgment logic 117 can be combined by any logic circuits and is not restricted to the embodiments of the present invention.

In conclusion, the present invention provides a method for compensating black cores of an image sensor and related black core compensation circuit. After the black core phenomenon is detected, the intensity Pi of the input pixel is corrected to the predetermined correction value COR1 if the intensity Pi of the input pixel is lower than the low threshold TL, where, the predetermined correction value COR1 is greater than the high threshold TH. After compensation, the black core phenomenon is eliminated. Furthermore, scanning one line at a time can make cost effectively. The effect gets better by further correction of the intensity of the input pixel which is greater than the low threshold TL and lower than the high threshold TH to the predetermined correction value COR1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A black core compensation circuit of an image sensor comprising:
    a first comparator having a first input end for receiving an input pixel and a second input end for receiving a first predetermined threshold, the first comparator used for comparing an intensity of the input pixel with the first predetermined threshold;
    a second comparator having a first input end for receiving the input pixel and a second input end for receiving a second predetermined threshold, the second comparator used for comparing the intensity of the input pixel with the second predetermined threshold; and
    a multiplexer having a first input end for receiving the input pixel and a second input end for receiving a predetermined correction value, the multiplexer used for outputting the input pixel or the predetermined correction value according to an output result from the first comparator and the second comparator and an output result from a counter and a judgment logic.

2. The black core compensation circuit of claim 1 wherein the counter is coupled to the first comparator, the second comparator, and the multiplexer.

3. The black core compensation circuit of claim 2 wherein the judgment logic is coupled to the first comparator, the second comparator, the counter, and the multiplexer, the judgment logic used for deciding an output value of the multiplexer according to the output result of the first comparator, the second comparator, and the counter.

* * * * *